US007470044B2

(12) United States Patent
Maes

(10) Patent No.: US 7,470,044 B2
(45) Date of Patent: Dec. 30, 2008

(54) LIGHT DIFFUSION DEVICE

(75) Inventor: Manuel Maes, San Mateo, CA (US)

(73) Assignee: The Picture People, Foster City, CA (US)

( * ) Notice: Subject to any disclaimer, the term of this patent is extended or adjusted under 35 U.S.C. 154(b) by 296 days.

(21) Appl. No.: 11/277,212

(22) Filed: Mar. 22, 2006

(65) Prior Publication Data
US 2007/0223231 A1 Sep. 27, 2007

(51) Int. Cl.
F21V 5/00 (2006.01)
(52) U.S. Cl. .............................. 362/311; 362/3; 362/16; 362/17; 362/278; 362/297; 362/298; 362/300
(58) Field of Classification Search ...................... 362/3, 362/16, 17, 278, 297, 298, 300, 311
See application file for complete search history.

(56) References Cited
U.S. PATENT DOCUMENTS

| | | | |
|---|---|---|---|
| 4,052,607 A | 10/1977 | Larson | |
| 4,446,506 A | 5/1984 | Larson | |
| 4,594,645 A | 6/1986 | Terashita | |
| 5,023,756 A * | 6/1991 | Regester | 362/16 |
| 6,010,234 A | 1/2000 | Rahn | |
| 6,076,935 A | 6/2000 | Kester | |
| 6,709,121 B1 | 3/2004 | Lowe et al. | |

* cited by examiner

Primary Examiner—Sandra L. O'Shea
Assistant Examiner—Meghan K. Dunwiddie
(74) Attorney, Agent, or Firm—Orrick, Herrington & Sutcliffe LLP

(57) ABSTRACT

A light diffusion device permits a single light source to serve as both direct lighting and fill lighting for a photographic, theatrical or cinematographic subject. The light diffusion device partially reflects light emitted from a light source away from the subject, using a translucent panel. Additional translucent panels permit the reflected light to escape from the light diffusion device into the surrounding environment. The escaped light reflects from the surrounding environment, thereby creating fill light around the subject, thus reducing or eliminating undesirable shadowing.

7 Claims, 5 Drawing Sheets

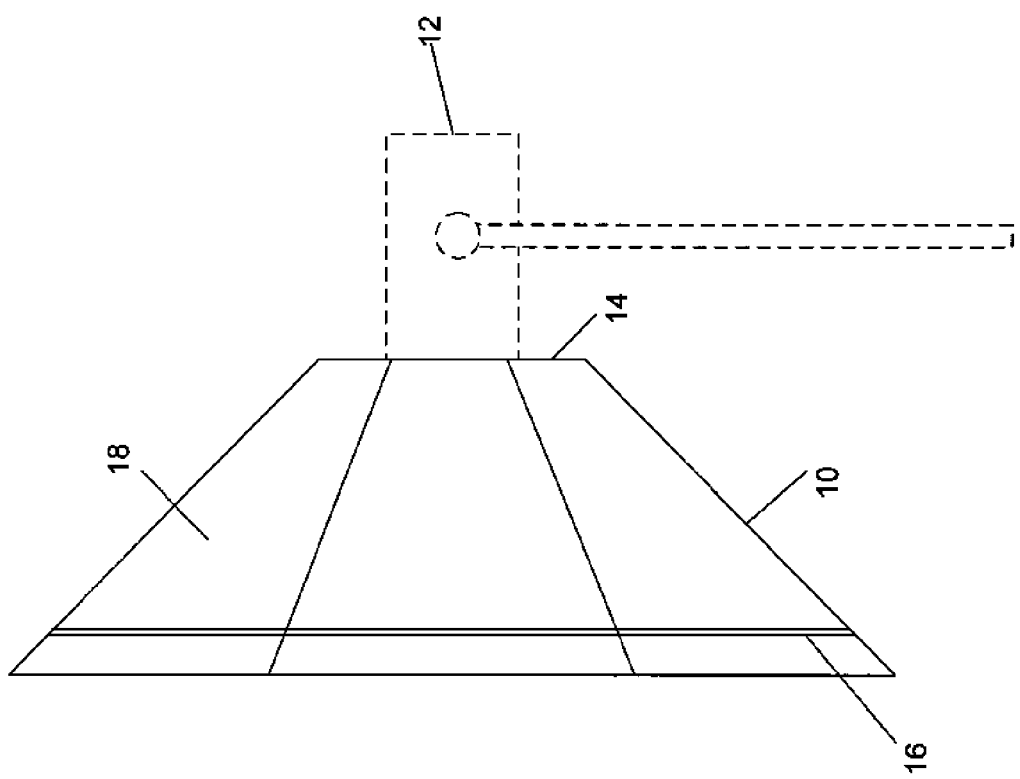

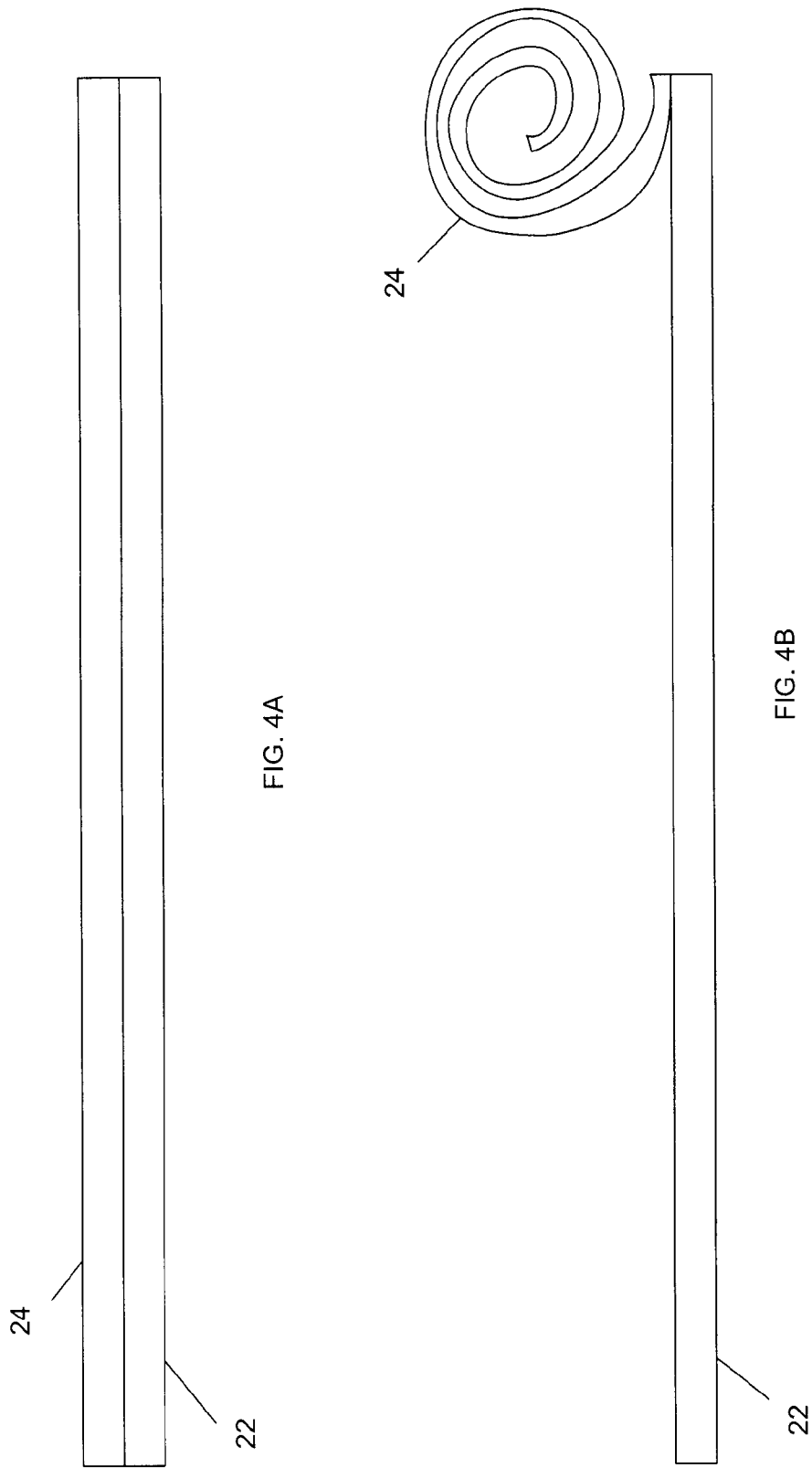

LIGHT DIFFUSION DEVICE

FIELD OF THE INVENTION

Embodiments of the invention relate to devices for diffusing light used in photography, theatre, motion and still pictures, and more particularly to devices which provide fill light.

BACKGROUND

When displaying subjects, for example for purposes of photography, motion pictures or theatre, it is frequently desirable to illuminate the subjects with strong lights, in order to improve the quality of the visual experience or visual record (i.e. photograph or movie). Thus there have been developed a wide variety of conventional lighting systems which provide this illumination. These lighting systems typically include a light source and a light directing screen or box arrayed about the light source, which directs the light towards the subject being displayed. These light boxes provide a strong direct light which is well-suited to illuminating the subject sufficiently for the subject to be easily perceived by a viewer such as a camera or, in the theatrical context, an audience.

A significant drawback of these lighting systems, however, is the fact that the strong direct lighting typically used in conventional lighting systems results in creation of significant and stark shadowing effects. These shadowing effects detract from the visual quality of the images recorded of the subjects, or of the visual experience of viewing the subjects. This shadowing effect is particularly undesirable when it is desired that the displayed subject appear as if the subject were illuminated with natural or indirect lighting (i.e. for an outdoor photograph or movie scene).

To reduce the intensity of shadows caused by the direct lighting of these conventional lighting systems, secondary fill lights are frequently deployed, which direct light towards the subject from different directions. For example, if the subject is located in a room, the secondary fill lights are aimed at the various walls of the room, such that the light from the secondary fill lights reflects off of the walls, ceiling or floor of the room and illuminates the subject from a variety of different angles, thereby reducing the intensity of the shadows created by the main, direct lighting system. These extra lights, however, are an added expense to the lighting system, and they require additional space to be transported, assembled and used. Thus there is a need for a light diffusion device which provides indirect fill lighting without requiring additional secondary fill lights.

SUMMARY OF THE INVENTION

In an aspect of an embodiment of the invention, direct light and fill light are provided from a single light source.

In another aspect of an embodiment of the invention, light is directed from a single light source towards a subject, and partially reflected away from the subject using a translucent panel.

In another aspect of an embodiment of the invention, a translucent back panel reflects light towards a subject and allows other light to be transmitted away from the subject, to provide fill light.

In another aspect of an embodiment of the invention, directional fill light from a single light source is created by selecting back panels of a light diffusion device to be either opaque or translucent.

In another aspect of an embodiment of the invention, a fill light level is controlled by manipulating the index of reflectivity of a translucent panel disposed between a light source and a subject.

BRIEF DESCRIPTION OF THE DRAWINGS

The accompanying drawings are included to provide a further understanding of embodiments of the invention and together with the Detailed Description, serve to explain the principles of the embodiments disclosed.

FIG. 2. depicts a side view of the light diffusion device of an embodiment of the invention.

FIG. 4A depicts a side view of a panel having a translucent layer and an opaque layer, used in the light diffusion device of an embodiment of the invention.

FIG. 4B depicts the panel of FIG. 4A, with the opaque layer retracted.

DETAILED DESCRIPTION OF THE PREFERRED EMBODIMENTS

Figure 1:
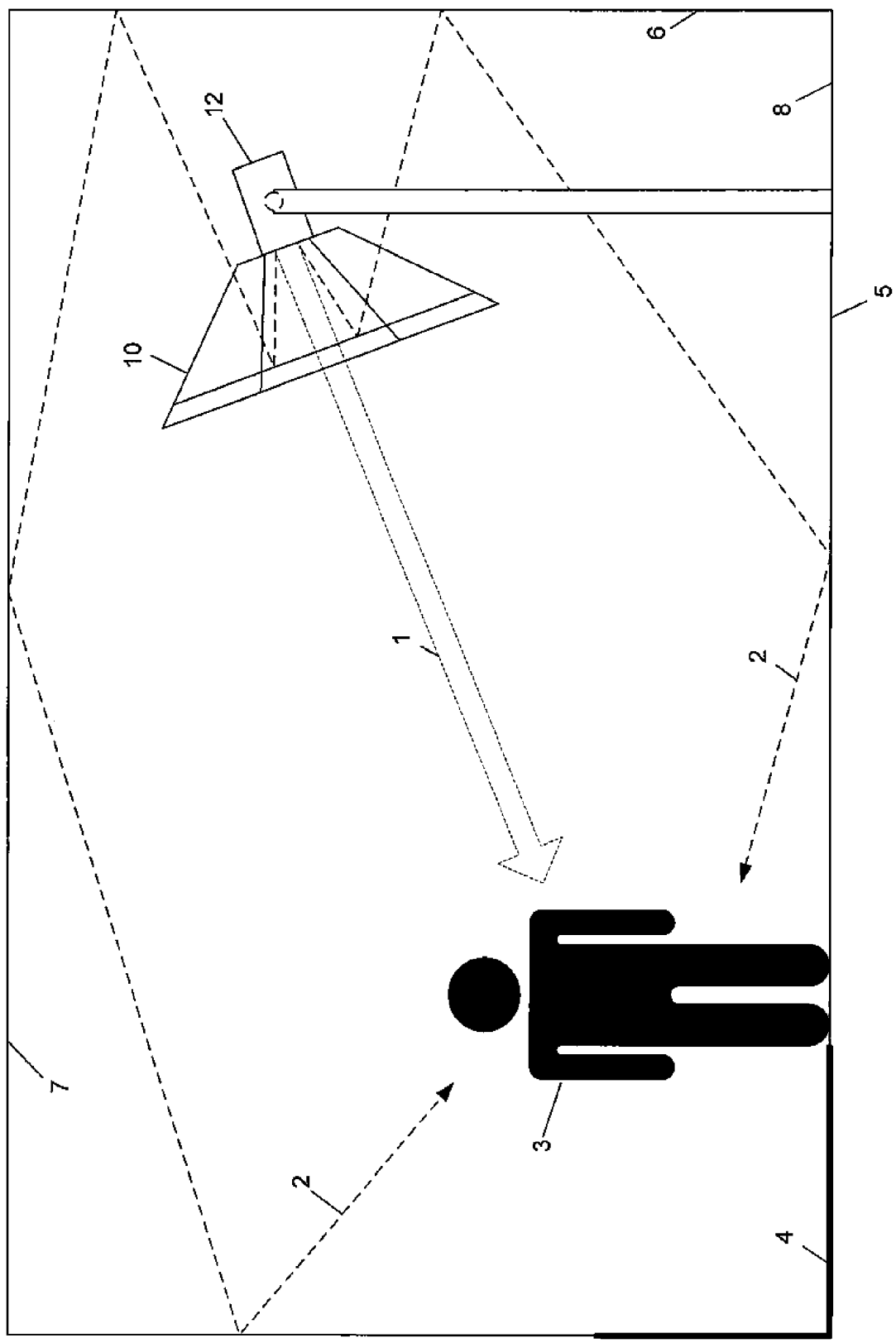
FIG. 1 depicts an environment in which a light diffusion device is used to illuminate a subject.

Turning to FIG. 1, a light diffusion device 10 according to an embodiment of the invention is used to illuminate a subject 3, such as a person whose picture is being taken by a camera, with direct light 1 and fill light 2 from a single light source 12. The subject 3 is located within an environment 5, in this example a photography studio. The environment 5 includes objects within the environment, in this example walls 6, ceiling 7 and floor 8, off of which the fill light 2 reflects. The direct light 1 creates an undesirable shadow 4 behind the subject 3. The direct light 1 can also create shadows on the subject 3, such as a shadow from the subject's facial features. The fill light 2 reduces the strength of these shadows, because the fill light 2 illuminates the subject 3 from different directions than the direct light 1, and thus provides fill lighting which fills in the shadows with light.

An embodiment of the light diffusion device 10 is shown in side view in FIG. 2. The light diffusion device 10 is adapted to be attached to a light source 12, such as a photographic light, a flash discharge light, or any of a variety of stage or motion picture lights used to illuminate subjects for photography, theatrical presentations, movies, etc. In an embodiment, the light diffusion device 10 is attached to the light source 12 via a housing 14. The housing 14 may be attached to the light source 12 using clamps, screws, bolts, or any other convenient form of fastening. Alternatively, the housing may be placed in cooperation with the light source 12 by suspending the light diffusion device 10 in front of the light source 12, though use of a stand, a ceiling hanger mount, or other such positioning device which causes the light diffusion device 10 to be placed between the light source 12 and the subject 3.

The light diffusion device 10 includes the housing 14 for the light source 12. The light diffusion device 10 also includes a first translucent panel 16, operating in cooperation with the light source 12. The first translucent panel 16 is placed between the light source 12 and the subject 3. The first translucent panel 16 is constructed from a translucent material, such as nylon, rayon or other polyester fabrics. Alternatively a soft or hard plastic material may be used. This material acts to reflect some of the light emitted by the light source 12 back away from the subject 3 in various directions. The amount of light transmitted by or reflected by the material is measured by referencing a transmission percentage for the material. The more opaque the material, the lower the transmission percentage, and the greater the reflectivity. The transmission percentage of the materials used in the first translucent panel 16 of an embodiment range from between 10% to 90%, with the range from 25% to 75% providing a good result.

The material also allows some of the light emitted by the light source 12 to penetrate the first translucent panel 16 and be transmitted onwards to illuminate the subject 3. The amount of light reflected by the first translucent panel 16 can be modified by manipulating the transmission percentage of the first translucent panel 16. For example, the first translucent panel 16 may be replaced with another translucent panel having a different transmission percentage.

The light diffusion device 10 also includes a second translucent panel 18. The second translucent panel 18 is constructed from similar materials to the first translucent panel 16, discussed above. The transmission percentage of the materials used in the second translucent panel 18 of an embodiment also range from between 10% to 90%, with the range from 25% to 75% providing a good result. The second translucent panel 18 is aligned to reflect some of the light emitted from the light source 12 such that this light is directed towards the subject 3. For example, the second translucent panel 18 is aligned as a portion of a parabolic curve having the light source 12 at the focal point of the parabolic curve, and the subject 3 at the open end of the parabolic curve. Alternatively, the second translucent panel 18 may be aligned as a portion of other useful shapes such a square or triangular angled box, with the housing 14 at the closed end, and the light being transmitted from the open end. The second translucent panel 18 thus cooperates with the light source 12 to direct additional light towards the subject 3. Additionally, some of the light emitted by the light source 12 may be permitted to penetrate the second translucent panel 18 and be transmitted out of the light diffusion device 10.

In addition to cooperating with the light source 12, the second translucent panel 18 cooperates with the first translucent panel 16. In an example embodiment, the first translucent panel 16 is attached to the second translucent panel 18, using clips, clamps, or the like. Alternatively, the first translucent panel 16 may be suspended in front of the second translucent panel 18 using a stand, ceiling mount or other similar positioning device which places the first translucent panel 16 in cooperation with the second translucent panel 18.

In addition to directing light from the light source 12 towards the subject 3, the second translucent panel 18 also cooperates with the first translucent panel 16 by permitting some of the light which was reflected backwards by the first translucent panel 16 to be transmitted through the second translucent panel 18, and out of the light diffusion device 10. The transmitted light then reflects off of the surrounding environment, such as off of the various walls 6, ceiling 7 and floor 8 of the room in which the light diffusion device 10 is situated, as seen in FIG. 1. This reflected fill light 2 strikes the subject 3 from a wide variety of angles, which acts to reduce or eliminate the shadows caused by the direct light 1 which was transmitted through the first translucent panel 16 and onto the subject 3. No secondary fill lights are necessary, since both the direct light 1 and the fill light 2 are generated by the light source 12.

Figure 3A:
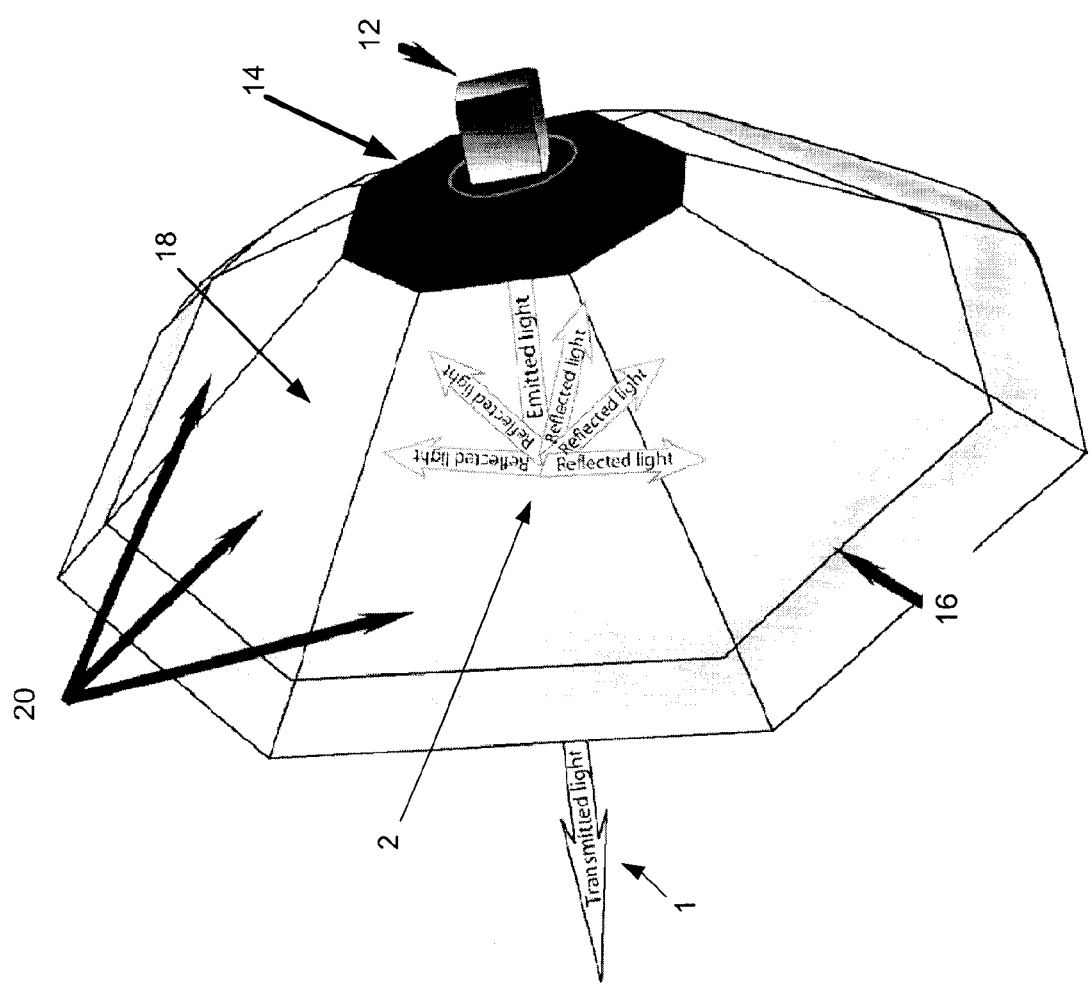
FIGS. 3A-B depicts a rear view of the light diffusion device of an embodiment of the invention.
Figure 3B:
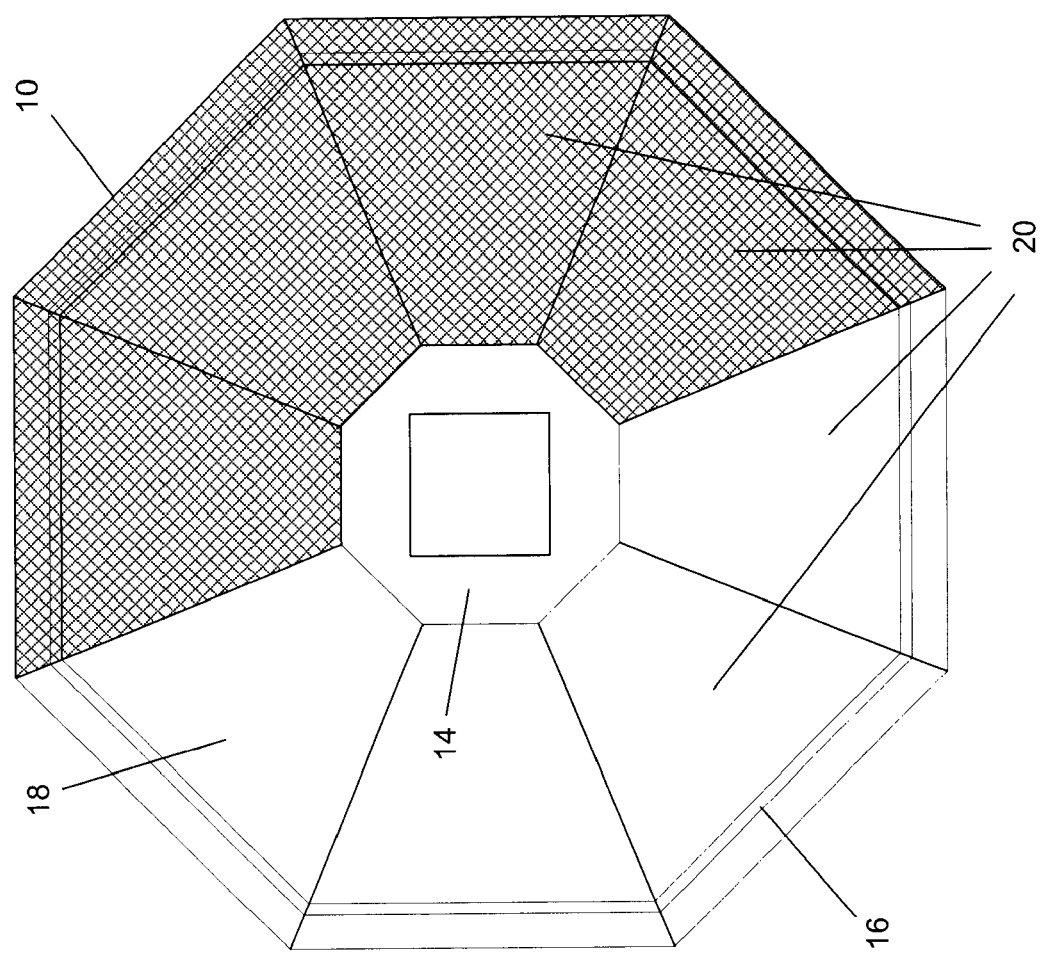

Turning to FIGS. 3A-B, a rear view of the light diffusion device 10 of an embodiment is shown. As can be seen in this view, the light diffusion device 10 is constructed of a plurality of panels 20 arranged radially about the housing 14, including the second translucent panel 18. In an embodiment, the plurality of panels are all translucent panels, to allow light to be reflected from the first translucent panel 16 and through the plurality of panels 20 in all directions thereby creating fill light in all directions. Alternatively, where it is desired to create fill light only in certain directions, some of the panels 20 may be opaque, and others of the panels 20 may be translucent. The opaque panels 20 block the reflected light from the first translucent panel 16, whereas the translucent panels 20 permit some of the reflected light from the first translucent panel 16 to be transmitted through the translucent panels 20 and out into the environment. In an embodiment, the opaqueness of the panels 20 is selectively controllable. By selectively controlling which panels 20 are opaque and which panels 20 are translucent, the direction of the fill lighting can be controlled. This control allows for light to be added only to certain areas of a scene, such as only to the background, or only on the left or right side.

Turning to FIGS. 4A-B, in an embodiment each panel 20 includes a translucent layer 22 and an opaque layer 24. The translucent layer 22 is fixed in position permanently, and the opaque layer 24 is removably fastened to the translucent layer 22, for example using zippers or snaps, or using an automatic retractor similar to a roll-up window shade. When an operator of the light diffusion device 10 wishes to make a particular panel 20 opaque, the operator fastens the opaque layer 24 over the translucent layer 22, as shown in FIG. 4A, such that light from the light source 12 and reflected light from the first translucent panel 16 does escape through the panel 20. When the operator wishes to make a particular panel translucent, the operator removes the opaque layer 24 from the translucent layer 22, as shown in FIG. 4B, to allow light from the light source 12 and the first translucent panel 16 to escape through the panel 20.

In the foregoing specification, the invention has been described with reference to specific embodiments thereof. It will, however, be evident that various modifications and changes may be made thereto without departing from the broader spirit and scope of the invention. For example, the panels can be constructed in different shapes and configurations than shown in the example embodiment, and different materials may be used to construct the panels. Furthermore, different forms of attachment or cooperation may be used to assemble or configure the various parts of the light diffusion device. The specification and drawings are, accordingly, to be regarded in an illustrative rather tan restrictive sense, and the invention is not to be restricted or limited except in accordance with the following claims and their legal equivalents.

I claim:

1. A light diffusion device for illuminating a subject with light emitted from a light source, the light diffusion device comprising:
   a housing for the light source;
   a first translucent panel located between the light source and the subject, aligned to reflect, substantially away from the subject, light emitted from the light source; and
   a second translucent panel cooperating with the housing and the first translucent panel, aligned to reflect, towards the subject, light emitted from the light source and to transmit, through the second translucent panel, light reflected from the first translucent panel, wherein the second translucent panel is located substantially behind the light source.

2. The light diffusion device of claim 1, further comprising an opaque panel cooperating with the housing, the first translucent panel and the second translucent panel, aligned to reflect, towards the subject, light emitted from the light source and to substantially reflect light reflected from the first translucent panel.

3. The light diffusion device of claim 2, wherein the opaque panel removably covers the second translucent panel.

4. The light diffusion device of claim 1, wherein the light diffuser further comprises a plurality of transparent panels, including the second translucent panel, arrayed substantially radially about the housing.

5. The light diffusion device of claim 1, wherein the light transmitted through the second translucent panel provides fill light to illuminate the subject.

6. The light diffusion device of claim 1, wherein the first translucent panel comprises a transmission percentage, and the transmission percentage is configurable.

7. The light diffusion device of claim 6, wherein the transmission percentage is configurable by removing the first translucent panel and replacing it with a third translucent panel having a different transmission percentage.

* * * * *